US008984554B2

(12) United States Patent
Aoki et al.

(10) Patent No.: US 8,984,554 B2
(45) Date of Patent: Mar. 17, 2015

(54) HYBRID TUNER CONTROL

(75) Inventors: Shigeru Aoki, Tokyo (JP); Atsushi Osaki, Kawasaki (JP)

(73) Assignee: Microsoft Technology Licensing, LLC, Redmond, WA (US)

( * ) Notice: Subject to any disclaimer, the term of this patent is extended or adjusted under 35 U.S.C. 154(b) by 430 days.

(21) Appl. No.: 12/949,924

(22) Filed: Nov. 19, 2010

(65) Prior Publication Data
US 2012/0131605 A1  May 24, 2012

(51) Int. Cl.
*H04N 5/50* (2006.01)
*H04N 5/445* (2011.01)
*H04N 5/46* (2006.01)
*H04N 21/426* (2011.01)
*H04N 21/462* (2011.01)

(52) U.S. Cl.
CPC ............ *H04N 5/50* (2013.01); *H04N 5/44543* (2013.01); *H04N 5/46* (2013.01); *H04N 21/42638* (2013.01); *H04N 21/4622* (2013.01)
USPC ............... 725/38; 348/731; 348/732; 725/27; 725/85; 725/93

(58) Field of Classification Search
USPC ......... 725/27, 58, 78, 86, 110, 131, 133, 139, 725/141, 147; 348/731, 732
See application file for complete search history.

(56) References Cited

U.S. PATENT DOCUMENTS 5,583,576 A * 12/1996 Perlman et al. .................. 725/28
5,708,475 A * 1/1998 Hayashi et al. ................ 348/468
6,493,873 B1 * 12/2002 Williams ......................... 725/78
6,701,526 B1 * 3/2004 Trovato ........................... 725/39
6,766,100 B1 * 7/2004 Komar et al. ................. 386/230
6,788,882 B1 * 9/2004 Geer et al. .................... 386/243
7,194,753 B1 * 3/2007 Fries et al. ...................... 725/38
7,225,458 B2 * 5/2007 Klauss et al. ................... 725/63
7,673,319 B1    3/2010 Hendricks et al.
7,792,507 B2    9/2010 Sanders et al.
8,127,329 B1 * 2/2012 Kunkel et al. ................... 725/41
8,281,352 B2 * 10/2012 Brooks et al. ................... 725/95

(Continued)

OTHER PUBLICATIONS

"AVerMedia AVerTV Hybrid Ultra USB (Media Center Upgrade Kit)", Retrieved at <<http://reviews.cnet.com/desktop-monitors-displays-accessories/avermedia-avertv-hybrid-ultra/1707-6513_7-32563590.html >>, Aug. 7, 2007, pp. 5.

(Continued)

*Primary Examiner* — An Son P Huynh
(74) *Attorney, Agent, or Firm* — Nicholas Chen; Kate Drakos; Micky Minhas

(57) ABSTRACT

A hybrid tuner, comprising multiple individual tuners having differing capabilities of receiving programs or channels of broadcast audio or video content, can be controlled by periodically determining the capabilities of each individual tuner to receive broadcast channels, storing such information into a guide database and then utilizing such information to select appropriate individual tuners to tune in desired programs. If the tuners that can receive a desired program are already in use, the program they are currently receiving can be switched to a different tuner to free up the tuner that can receive the desired program without interrupting the consumption of the program currently being received. When determining the capabilities of an individual tuner to receive a particular channel, one or more tokens associated with such a channel, and utilized to prevent unauthorized access to such a channel, can be obtained from the guide database and provided to the tuner.

20 Claims, 3 Drawing Sheets

(56) References Cited

U.S. PATENT DOCUMENTS

| | | | |
|---|---|---|---|
| 8,355,686 B2* | 1/2013 | De Luca et al. | 455/184.1 |
| 2002/0023262 A1* | 2/2002 | Porter | 725/25 |
| 2002/0029384 A1* | 3/2002 | Griggs | 725/46 |
| 2002/0046404 A1* | 4/2002 | Mizutani | 725/58 |
| 2002/0053081 A1* | 5/2002 | Griggs | 725/39 |
| 2003/0188316 A1* | 10/2003 | DePrez | 725/87 |
| 2004/0093402 A1* | 5/2004 | Liu et al. | 709/223 |
| 2004/0255627 A1* | 12/2004 | Shimon | 70/379 R |
| 2005/0005300 A1* | 1/2005 | Putterman et al. | 725/89 |
| 2005/0022241 A1* | 1/2005 | Griggs | 725/48 |
| 2005/0022243 A1* | 1/2005 | Scheelke | 725/78 |
| 2005/0071882 A1* | 3/2005 | Rodriguez et al. | 725/95 |
| 2005/0267994 A1* | 12/2005 | Wong et al. | 709/246 |
| 2006/0025092 A1* | 2/2006 | Sanders et al. | 455/161.1 |
| 2006/0029371 A1* | 2/2006 | Tanaka | 386/96 |
| 2006/0035610 A1* | 2/2006 | Potrebic | 455/178.1 |
| 2007/0157281 A1* | 7/2007 | Ellis et al. | 725/134 |
| 2007/0222900 A1 | 9/2007 | Yamaguchi et al. | |
| 2008/0025694 A1* | 1/2008 | Kang | 386/83 |
| 2008/0066106 A1* | 3/2008 | Ellis et al. | 725/40 |
| 2008/0066111 A1* | 3/2008 | Ellis et al. | 725/57 |
| 2008/0089362 A1 | 4/2008 | Ezra et al. | |
| 2008/0155618 A1* | 6/2008 | Grady et al. | 725/97 |
| 2009/0158368 A1 | 6/2009 | Cirrincione et al. | |
| 2009/0222875 A1* | 9/2009 | Cheng et al. | 725/147 |
| 2009/0282439 A1 | 11/2009 | Irwin et al. | |
| 2010/0017841 A1* | 1/2010 | Ambilkar et al. | 725/149 |
| 2010/0018741 A1* | 1/2010 | Rhea et al. | 174/87 |
| 2010/0045875 A1* | 2/2010 | Pugel | 348/731 |
| 2010/0058386 A1 | 3/2010 | Hawkins et al. | |
| 2010/0165214 A1* | 7/2010 | Strater et al. | 348/732 |
| 2011/0013091 A1* | 1/2011 | Kim | 348/731 |
| 2011/0302606 A1* | 12/2011 | Berrett et al. | 725/39 |

OTHER PUBLICATIONS

Mathews, Brian D., "Digital TV for the Future: Hybrid Analog/Digital-TV Receiver Design", Retrieved at <<http://www.edn.com/contents/images/6541384.pdf>>, Mar. 20, 2008, pp. 3.

"Office Action and Search Report Issued in Chinese Patent Application No. 201110367797.5", Mailed Date: Dec. 19, 2013, 9 Pages.

* cited by examiner

HYBRID TUNER CONTROL

BACKGROUND

Traditionally, the receipt of broadcast audio or video content was performed by specialized audio/video hardware, such as television tuners, cable boxes, satellite television tuners, video cassette recorders, and other like specialized audio/video hardware. More recently, however, the storage and processing capabilities of computing devices have sufficiently increased to enable the utilization of computing devices for the receipt and recording of broadcast audio or video content. Broadcast audio or video content is still broadcast through signals, either transmitted through wiring directly to the user, such as via a cable network, or transmitted over the air and received by an appropriate antenna local to the user, including, for example, satellite antennas that are utilized to receive broadcast audio or video content that is transmitted from one or more satellites. As such, broadcast audio or video content still requires one or more tuners to appropriately receive such signals, including, for example, satellite tuners and cable television tuners, including both analog and digital tuners. Traditionally, such tuners interface with a computing device through a peripheral interface by which the signals received by such tuners are converted into information that the computing device can process and store. Additionally, such tuners typically comprise mechanisms by which the computing device can control the tuner, such as, for example, selecting a particular channel of the broadcast audio or video content to be tuned to by the tuner, thereby delivering the audio or video content of the selected channel to the computing device in the form of information that can be processed and stored by the computing device.

Some computing devices that comprise, or are otherwise communicationally coupled with, one or more tuners are dedicated audio/video content devices. For example, modern digital video recorders are computing devices with one or more tuners whose operating systems are optimized for an environment in which the user is typically located at some distance from a display device that is communicationally coupled to such digital video recorders and in which the user typically does not have access to anything other than a simple controller, such as, for example, a remote control device that may only comprise a few buttons. As such, the operating system of a computing device being utilized as a digital video recorder can be optimized to display simple interfaces to a user and enable the user to perform simple tasks utilizing only traditional left/right, up/down and select buttons.

Other computing devices that comprise, or are otherwise communicationally coupled with, one or more tuners may be more traditional general-purpose computing devices that merely comprise the capability for receiving, displaying and storing one or more selections of broadcast audio or video content. Such computing devices are typically utilized by the user to perform general purpose computing tasks, including content creation tasks, content tasks, such as games, and network connectivity tasks, such as utilizing electronic mail. In addition, such computing devices can, by virtue of their communicational connection to one or more tuners, additionally be utilized to receive, display and record broadcast audio or video content, such as within a designated area of the display being generated by such a computing device.

Computing devices that are communicationally coupled with one or more tuners can be utilized to receive, display and record broadcast audio or video content. Traditionally, such functionality is utilized by users to select specific programs from among the broadcast audio or video content that the user either wishes to watch, record, or a combination thereof. Modern computing devices with one or more tuners, however, do not differentiate between the multiple tuners, except during an initial setup routine. Consequently, once such multiple tuners have been properly installed in the computing device and communicationally coupled with one or more processes executing on such a computing device, there is no further verification made to determine whether any particular tuner can receive the selected program and, in cases where multiple tuners of the same type are communicationally coupled with a single computing device, there is no further determination made as to whether any one particular tuner, from among those multiple tuners of the same type, is to be utilized to receive the selected program.

SUMMARY

In one embodiment, hybrid tuner control, or control of multiple, independent tuners having differing capabilities, can be achieved through periodic checking of the tuners' abilities to receive broadcast audio or video content. A guide, or database, of broadcast audio or video content can then be updated with the results of such a periodic checking so that, when a specific program of broadcast content is selected, such information can be utilized to identify which one or more tuners can be utilized to tune in the selected program.

In another embodiment, a determination can be made as to whether a tuner that can receive a selected program is being utilized to receive different broadcast audio or video content and, if such a tuner is being utilized, and if the broadcast audio or video content that it is receiving is likewise capable of being received by a different tuner that can not tune in the selected program, an automatic switch can be made between the tuners such that the selected program can be received by the tuner capable of receiving it without interrupting the receipt of different broadcast content by the overall hybrid tuner system.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
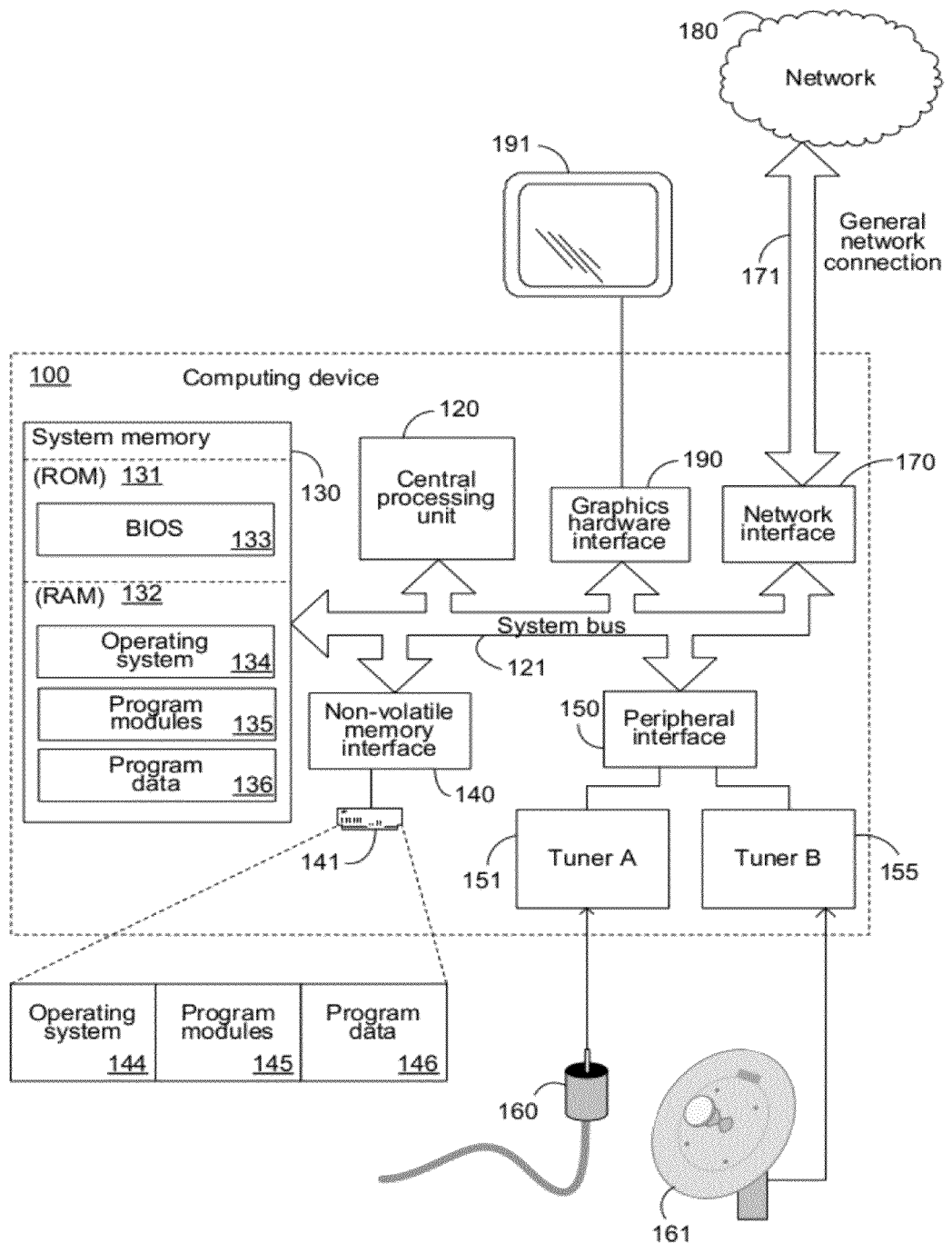
FIG. 1 is a block diagram of an exemplary computing device.

The following description relates to the control of a hybrid tuner system comprising at least two individual tuners whose capabilities to receive broadcast audio or video content differ. The capabilities of the individual tuners can be periodically verified and a guide, or database, of broadcast audio or video content can then be updated with the results of such a periodic verification. When a particular program of broadcast content is selected, the database can be consulted and one or more individual tuners that are capable of receiving such a program can be identified. If any one of those identified tuners is available, it can be utilized to tune in, and receive, the selected program of broadcast content. However, if no identified tuner is available, a check can be made as to whether the current program of broadcast content that is being received by the one or more identified tuners can be tuned in, and received, by any other individual tuner that can not, otherwise, receive the selected program. If the current program can likewise be received by another tuner, then a switch can be made in a seamless manner such that the current program is being received by the other tuner, thereby freeing up at least one of the identified tuners for receiving the selected program. If no other tuner can receive the current program, then the user can be prompted and be allowed to select between continuing to receive the current program or receiving the selected program.

For purposes of illustration, the techniques described herein are directed to traditional broadcast television programs, such as are traditionally delivered by transmission through dedicated cable, or through over-the-air transmission, including transmission from one or more satellites to one or more locally mounted reception antennas, or dishes. Such references, however, are strictly exemplary and are not intended to limit the mechanisms described to the specific examples provided. Indeed, the below described mechanisms are equally applicable to any broadcast audio content, video content, or combination thereof. References to television programs were selected only because they provide a conceptual framework that will be readily apparent to those skilled in the art and, as such, provide a useful framework for describing at least one embodiment of the hybrid tuner control described. As such, references to television programs below are meant to be broadly interpreted to encompass any broadcast audio content, video content, or combination thereof, irrespective of the medium, or mechanism, through which such content is broadcast.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

Turning to FIG. 1, an exemplary computing device 100 is illustrated. The exemplary computing device 100 can provide context for the descriptions below and is intended to represent either a dedicated audio/video device, such as a user may have connected to an audio/video system and such as may be controlled by a simple remote control, and a general-purpose computing device having two or more tuners communicationally coupled to it to enable a user to perform both general-purpose computing tasks, such as content creation tasks, as well as enabling the user to be presented with broadcast audio and video content.

The exemplary computing device 100 of FIG. 1 can include, but is not limited to, one or more central processing units (CPUs) 120, a system memory 130, that can include RAM 132, and a system bus 121 that couples various system components including the system memory to the processing unit 120. The system bus 121 may be any of several types of bus structures including a memory bus or memory controller, a peripheral bus, and a local bus using any of a variety of bus architectures. The computing device 100 can include graphics hardware, such as for the display of visual user interfaces and broadcast video content, and that graphics hardware can include, but is not limited to, a graphics hardware interface 190 and a display device 191. Additionally, the computing device 100 can also include a hybrid tuner comprised of multiple individual tuners having varying capabilities to receive broadcast audio and video content. For purposes of illustration, the exemplary computing device 100 is shown comprising two tuners 151 and 155, whose functionality and operation will be described in further detail below. The hybrid tuner, comprising the multiple tuners, such as the tuners 151 and 155, can be communicationally coupled to the system bus 121 via a peripheral interface 150. The peripheral interface 150 can include internal peripheral interfaces, such as, for example, various expansion slots and the like, and can also include external peripheral interfaces, such as, for example, ports conforming to one or more communicational specifications. Thus, while the tuners 151 and 155 are illustrated as being a part of the computing device 100, such an illustration is not meant to indicate that the tuners 151 and 155 are strictly internal, card-based tuners, and, instead, is likewise meant to represent external tuners, such as can be communicationally coupled with the computing device 100 via one or more external peripheral interfaces.

As indicated previously, the multiple individual tuners of a hybrid tuner can differ in the broadcast audio or video content that they can tune into. In one embodiment, such a difference can be the result of the individual tuners of a hybrid tuner receiving different types of broadcast audio or video content. Thus, as shown in FIG. 1, one tuner, such as the tuner 151, can receive the broadcast audio or video content that can be transmitted via a cable 160, while another tuner, such as the tuner 155, can receive the broadcast audio or video content that can be transmitted from one or more satellites and received by a satellite dish 161. In such an embodiment, the broadcast audio or video content that is transmitted via the cable 160 can differ from the broadcast audio or video content that is received by the satellite dish 161 and, consequently, the broadcast audio or video content that can be tuned in by the tuner 151 can differ from the broadcast audio or video content that can be tuned in by the tuner 155. Although only cable and satellite broadcast content delivery mechanisms are illustrated, any differing broadcast content delivery mechanisms can fall within the preview of such an embodiment.

In another embodiment, that is not specifically illustrated in FIG. 1, the difference between the multiple individual tuners of a hybrid tuner can be the result of different capabilities associated with the tuners themselves, as opposed to different broadcast content delivery mechanisms being communicationally coupled to the tuners. Thus, for example, the tuners 151 and 155 can both be communicationally coupled to the same transmission medium and, as a result, can both receive the same broadcast audio or video content. However, one tuner can comprise capabilities that can enable that tuner to tune in different aspects of the broadcast audio or video content that is equally received by the other tuner. For example, such a tuner be provided with, or can otherwise comprise decryption algorithms or information that can enable that tuner to decrypt otherwise encrypted, or protected, broadcast audio or video content. By contrast, the other tuner, lacking such capabilities, may not be able to decrypt such protected content and, as a result, cannot tune in such content. Such differing capabilities can be the result of hardware differences, such as hardware differences arising from extensibilities of the tuners. For example, the tuners may be capable of receiving or interacting with sub-cards or other like hardware that can contain proprietary circuitry with which to enable a tuner to tune in otherwise protected content. The differing capabilities of the tuners can also be the result of differences enforced by software. For example, one tuner may be authorized to receive certain content and, as a result, may be provided with the relevant information, such as a decryption key, with which to receive such content, where such relevant information can be specifically coded to some unique aspect of that tuner, such as, for example, a unique identifier assigned to that tuner. In such a case, although there may be no physical difference between the tuners, such an authorization of one tuner can enable that tuner to tune in broadcast audio or video content that is protected and, as a result, cannot be tuned in by the other tuner. In either case, the multiple individual tuners of the hybrid tuner system can differ in the broadcast audio and video content that such tuners can tune into.

Turning back to the remainder of FIG. 1, the computing device 100 also typically includes computer readable media, which can include any available media that can be accessed by computing device 100 and includes both volatile and non-volatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, solid state storage media or any other medium which can be used to store the desired information and which can be accessed by the computing device 100. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and the aforementioned RAM 132. A basic input/output system 133 (BIOS), containing the basic routines that help to transfer information between elements within computing device 100, such as during start-up, is typically stored in ROM 131. RAM 132 typically contains data and/or program modules that are immediately accessible to and/or presently being operated on by processing unit 120. By way of example, and not limitation, FIG. 1 illustrates the operating system 134 along with other program modules 135, and program data 136.

The computing device 100 may also include other removable/non-removable, volatile/nonvolatile computer storage media. By way of example only, FIG. 1 illustrates the hard disk drive 141 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, other solid state storage devices and the like. The hard disk drive 141 is typically connected to the system bus 121 through a non-removable memory interface such as interface 140.

The drives and their associated computer storage media discussed above and illustrated in FIG. 1, provide storage of computer readable instructions, data structures, program modules and other data for the computing device 100. In FIG. 1, for example, hard disk drive 141 is illustrated as storing operating system 144, other program modules 145, and program data 146. Note that these components can either be the same as or different from operating system 134, other program modules 135 and program data 136. Operating system 144, other program modules 145 and program data 146 are given different numbers hereto illustrate that, at a minimum, they are different copies.

The computing device 100 can operate in a networked environment, represented by the network 180, using logical connections to one or more remote computers. The computing device 100 is illustrated as being connected to the general network connection 171 through a network interface or adapter 170 which is, in turn, connected to the system bus 121. In a networked environment, program modules depicted relative to the computing device 100, or portions or peripherals thereof, may be stored in the memory of one or more other computing devices that are communicatively coupled to the computing device 100 through the general network connection 171. It will be appreciated that the network connections shown are exemplary and other means of establishing a communications link between computing devices may be used.

Figure 2:
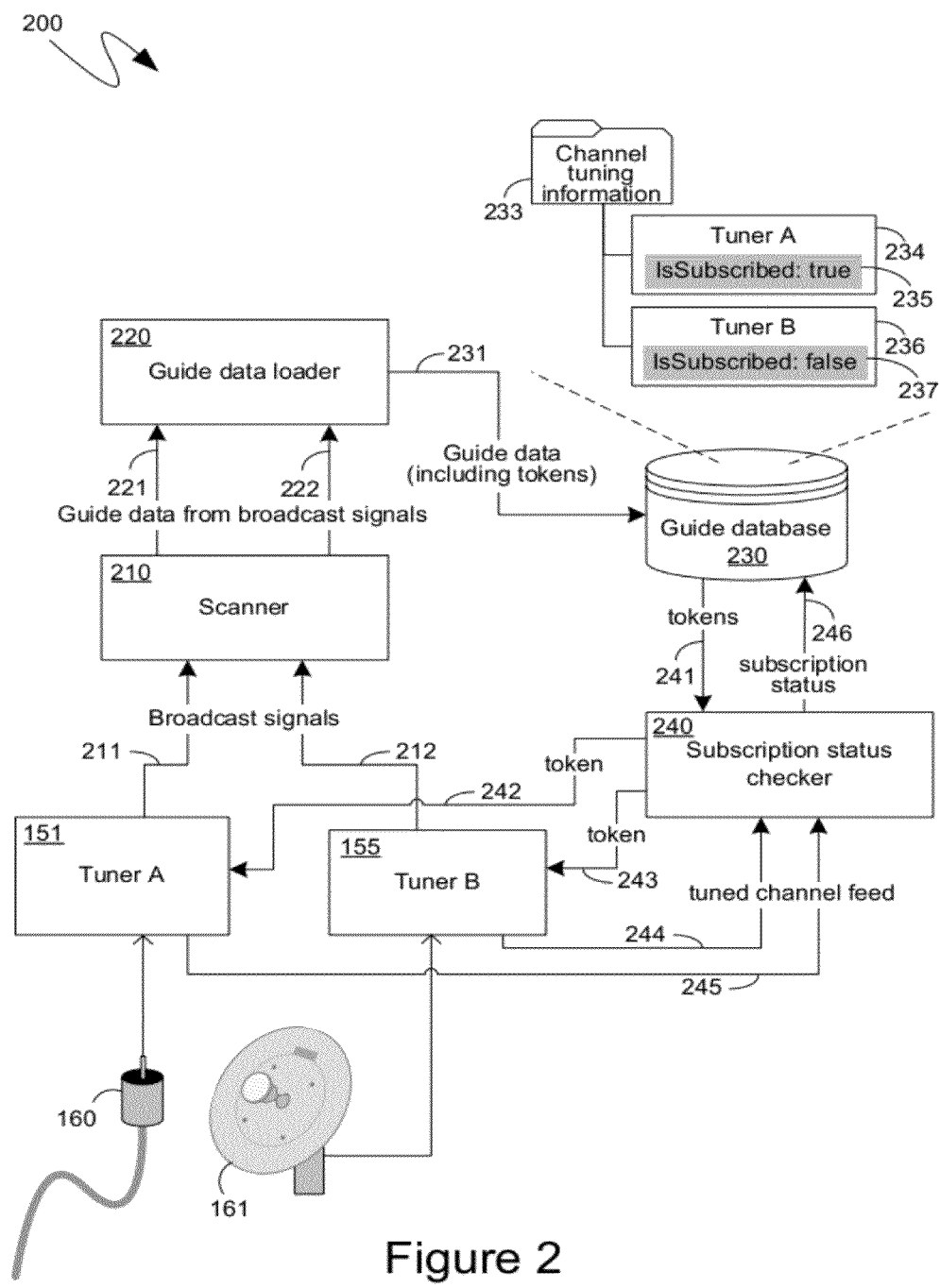
FIG. 2 is a block diagram of an operation of an exemplary hybrid tuner control mechanism.

Turning to FIG. 2, the system 200 shown therein illustrates an exemplary control of a hybrid tuner. Initially, the broadcast signals 211 and 212 that are received by the tuners 151 and 155, respectively, can be provided to a scanner 210 that can derive, therefrom, guide data that can provide information regarding the broadcast audio or video content that either is currently, or will be in the future, transmitted via the broadcast signals 211 and 212. As will be known by those skilled in the art, in many cases such guide data that provides information about current and future broadcast audio or video content can be part of the broadcast signals that can, for example, be carried by the cable 160, or received by the satellite dish 161, and provided to tuners, such as the tuners 151 and 155. In an alternative embodiment, if the broadcast signals 211 and 212 do not comprise such in-band guide data, the scanner 210 may be configured to obtain identifying information from the broadcast signals 211 and 212, and then utilize such identifying information to obtain, or have obtained on its behalf, the relevant guide data from other sources, such as, for example, from the network 180 shown in FIG. 1.

Once the scanner 210 has obtained the guide data 221 and 222 associated with the broadcast signals 211 and 212, respectively, the scanner can provide such guide data to an in guide data loader, such as the guide data loader 220, that can store such guide data in a guide database 230. The guide data 231 that can be stored in the guide database 230, by the guide data loader 220, can comprise "tokens" or other collections of information that can be utilized by, or on behalf of, a tuner, such as the tuners 151 and 155, to enable that tuner to tune in otherwise protected broadcast audio or video content. For example, a token can comprise a cryptographic key that can enable a tuner to decrypt broadcast audio or video content that is encrypted, or otherwise protected. As another example, a token can comprise an algorithm that can enable a tuner to descramble broadcast audio or video content that is scrambled, or otherwise protected. Typically, such audio or video content is protected because additional fees are charged to subscribers to receive such content. Consequently, individual tokens may be associated with specific channels of audio or video content. Such tokens can, like the guide data, be broadcast in-line along with the broadcast audio or video content that is received by the tuners 151 and 155. As such, the tokens can be identified by the scanner 210 and can be provided to the guide data loader 220 for storing in the guide database 230.

In one embodiment, a subscription status checker 240 can periodically access the guide database 230 and obtain therefrom tokens 241 that can comprise tokens 242 that can be relevant to the tuner 151 and tokens 243 that can be relevant to the tuner 155. The subscription status checker 240 can then provide the tokens 242 to the tuner 151, and the tokens 243 to the tuner 155, and can request the tuners 151 and 155 to tune in one or more channels of broadcast audio or video content including, for example, channels associated with the tokens 242 and 243 that were provided to the tuners 151 and 155, respectively. The subscription status checker 240 can then receive, in response, tuned channel feeds 244 and 245 from the tuners 151 and 155, respectively, presenting the channels of the broadcast audio or video content that the subscription status checker 240 had instructed the tuners 151 and 155, respectively, to tune into.

If the tuners 151 and 155 were able to utilize the tokens 242 and 243, respectively, provided by the subscription status checker 240, to properly tune in the channels of the broadcast audio or video content that were associated with such tokens, then the tuned channel feeds 244 and 245 that can be received by the subscription status checker 240 can comprise meaningful audio or video content. By contrast, if either of the tuners 151 or 155 was not able to utilize the tokens 242 and 243, respectively, to properly tune in one or more of the channels of the broadcast audio or video content that were associated with such tokens, then the tuned channel feed associated with those one or more channels that were not tuned in properly can comprise "static", null data, or otherwise meaningless audio or video content. The subscription status checker 240 can, thereby, determine whether any one of the individual tuners of the hybrid tuner, such as the tuners 151 and 155, can properly receive a particular channel of broadcast audio or video content.

In one embodiment, certain channels of broadcast audio or video content may not require tokens. Such channels can be identified, accordingly, in the guide database 230 and the guide database 230 need not comprise any tokens associated with such channels. Conversely, other channels can, as indicated previously, be associated with one or more tokens and, accordingly, the guide database 230 can associate such tokens with those channels. When periodically testing the hybrid tuner to determine which channels of broadcast audio or video content can be received by each one of the individual tuners of the hybrid tuner, the subscription status checker 240 can first reference the guide database 230 to determine whether any of the channels it will test are associated with one or more tokens. If such channels are not associated with any tokens, the subscription status checker 240 can simply request that the tuners, such as the tuners 151 and 155, attempt to tune in those channels. Conversely, if the channels that will be tested by this action status checker 240 are associated with tokens, the subscription status checker 240 can obtain such tokens 241, from the guide database 230, and provide them to the tuners, such as the tuners 151 and 155, as indicated previously.

Once the subscription status checker 240 obtains one or more tuned channel feeds, such as the tuned channel feeds 244 and 245, from the individual tuners of the hybrid tuner, the subscription status checker 240 can provide the subscription status 246 of each such tuner to the guide database 230. For example, if one of the individual tuners of the hybrid tuner was able to properly tune in a channel of broadcast audio or video content, then the subscription status 246, provided by the subscription status checker 240 to the guide database 230, can indicate that that tuner is, in fact, subscribed to that channel. Conversely, if one of the individual tuners of the hybrid tuner was not able to properly tune in a channel of broadcast audio or video content, even with an appropriately provided token, then the subscription status checker 240 can provide, to the guide database 230, an indication that that tuner is not subscribed to that channel.

In one embodiment, as illustrated by the system 200 of FIG. 2, the guide database 230, or at least a portion thereof, can be divided according to channels of broadcast audio or video content that can be received by at least one individual tuner of the hybrid tuner being controlled. In such an embodiment, each individual channel can have associated with it a collection of data regarding which one or more tuners can successfully receive such a channel and, thus, are considered to be subscribed to that channel. In the illustrated example of FIG. 2, this association is illustrated by a folder icon representing an associated collection of data. Of course, as will be recognized by those skilled in the art, references to "folders", and the usage of a folder icon in FIG. 2, is meant to be exemplary only and is not meant to specifically require a folder data structure, but rather is utilized to reference commonly understood concepts of data organization. As such, a portion of the guide database 230 is shown as comprising a channel tuning information folder 233 that can comprise information regarding each individual tuner of the hybrid tuner and whether each such individual tuner is subscribed to the channel represented by the channel tuning information folder 233. In the illustrated example shown in FIG. 2, the channel tuning information 233 can comprise a collection of information 234 associated with the tuner 151 and a collection of information 236 associated with the tuner 155. The collection of information 234 can, in this example, comprise a parameter 235, or other like data structure, indicating that the tuner 151 associated with the collection of information 234, is subscribed to the channel of broadcast audio or video content that is associated with the folder 233. In one embodiment, the parameter 235 can be in the form of a Boolean parameter, such as is shown in the example of FIG. 2. Similarly, the collection of information 236 can, in the illustrated example, comprise a parameter 237, or other like data structure, that can indicate that the tuner 155 associated with the collection of information 236, is not subscribed to the channel associated with the folder 233.

Because the subscription status checker 240 can periodically check the subscription status of the individual tuners on the hybrid tuner, dynamic changes to the ability of such individual tuners to receive one or more channels of broadcast audio video content can, likewise, be dynamically reflected in the guide database 230. The information in the guide database 230 can then be utilized to appropriately control the hybrid tuner to minimize disruptions and tune in as much of the broadcast audio and video content as is specified by, for example, a user of a computing device implementing such controls.

Figure 3:
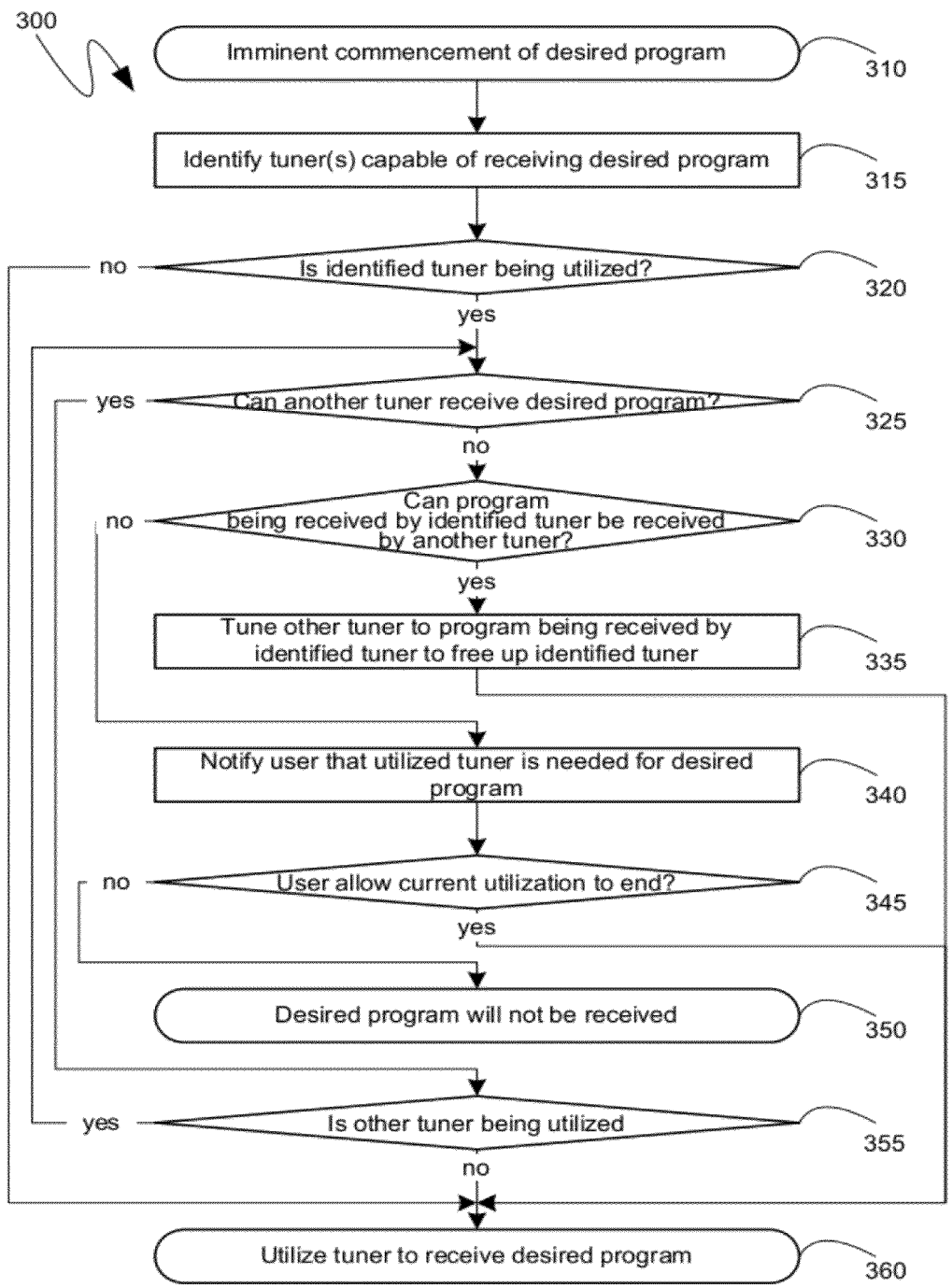
FIG. 3 is a flow diagram of an operation of an exemplary hybrid tuner control mechanism.

Turning to FIG. 3, the flow diagram 300 shown therein illustrates an exemplary series of steps by which a hybrid tuner, such as that described in detail above, can be controlled utilizing, for example, the information in the guide database provided by the subscription status checker. Initially, at step 310, a program of broadcast audio or video content that was selected by a user, such as, for example, a program that the user seeks to record, or seeks to watch, can be on the verge of starting. Because such a program of broadcast audio or video content is about to begin, one or more individual tuners of the hybrid tuner can be identified, at step 315, as being capable of receiving that program. In performing the identification of capable tuners at step 315, reference can be made to the guide database which can comprise information regarding whether or not each one of the individual tuners of the hybrid tuner can receive the desired program. For example, the guide database can comprise, such as in the manner described in detail above, an indication of whether or not each of the individual tuners is subscribed to the particular channel of broadcast audio or video content on which the desired program will be broadcast. Utilizing such information, the tuners capable of receiving that particular channel and, thus, the desired program being broadcast on that channel, can be identified at step 315.

At step 320, a determination can be made as to whether one of the tuners identified in step 315 is otherwise currently being utilized. For example, such a tuner can be currently being utilized to record a different program for the user, or to enable the user to watch, listen to, or otherwise consume a different program currently being broadcast. If, at step 320, it is determined that one of the tuners identified at step 315 is not currently being utilized, then processing can proceed to step 360 at which point that tuner can be utilized to receive the desired program, and the relevant processing can thereby end. Conversely, however, if, at step 320, one of the tuners identified at step 315 is currently being utilized, processing can proceed to step 325, at which point determination can be made as to whether any other tuners were likewise identified, at step 315, as being capable of receiving the desired program. If, at step 325, it is determined that other tuners were identified in step 315, processing can proceed to step 355 at which point a determination can be made as to whether one of those other identified tuners is being utilized. If, at step 355, it is determined that that other tuner is not being utilized, processing can again proceed to step 360 and the un-utilized tuner can, instead, be utilized to receive the desired program and the relevant processing can end. Conversely, however, if, at step 355, it is determined that another tuner, which was also identified at step 315, is also being utilized, processing can return to step 325 to determine if there are yet more tuners that were identified in step 315 that can receive the desired program.

If, at step 325, however, it is determined that all of the tuners that were identified at step 315 are currently being utilized, processing can proceed to step 330, and a determination can be made as to whether the program that is currently being received by a tuner that was identified at step 315 can, instead, be received equally well by another tuner. If, at step 330, the program currently being received by an identified tuner can, instead, be received by a different tuner, then, at step 335, that other tuner can be instructed to tune to the program that is currently being received by the tuner that can also receive the desired program, as identified in step 315. Subsequently, as part of step 335, the display or recording of the program that was being received by the identified tuner can be switched from the identified tuner to the other tuner, in order to free up the identified tuner for receiving the desired program. Processing can then, again, end at step 360, where a tuner identified at step 315 can be utilized to receive the desired program.

If the determination at step 330 reveals that all of the tuners identified at step 315, as being capable of receiving the desired program, are currently being utilized to receive other programs that cannot, themselves, be received by any other tuner, thus not allowing those identified tuners to be freed up to receive the desired program, processing can proceed to step 340 at which point the user can be notified that a tuner that is currently being utilized is needed to receive the desired program. The user's selection can be received at step 345. If, at step 345, the user allowed the current utilization of the identified tuner to end, then processing can, again, end at step 360, where that identified tuner can be utilized to receive the desired program. Conversely, if the user's selection, as received at step 345, indicates that the user did not allow the ending of the current utilization of a tuner identified at step 315, then processing can end at step 350, at which point the desired program will not be received because there is no tuner, capable of receiving that desired program, that has been made available to do so.

As can be seen from the above descriptions, mechanisms for hybrid tuner control have been enumerated. In view of the many possible variations of the subject matter described herein, we claim as our invention all such embodiments as may come within the scope of the following claims and equivalents thereto.

We claim:

1. One or more computer-readable memory comprising computer-executable instructions for controlling a hybrid tuner comprising a first tuner and a second tuner, the computer-executable instructions directed to steps comprising:

periodically and automatically providing, to a first tuner and a second tuner, both part of a hybrid tuner system, one or more tokens comprising cryptographic information directed to tuning in one or more protected channels of broadcast content, the one or more protected channels of broadcast content being transmitted in a protected form such that they can only be tuned in by tuners possessing valid tokens, wherein one of the first tuner and the second tuner can properly tune in at least one channel of the broadcast content that another of the first tuner and the second tuner cannot properly tune in;

periodically and automatically causing the first tuner and the second tuner to attempt to tune in the one or more protected channels of broadcast content utilizing the provided one or more tokens;

storing, in a guide database, on a per-channel basis, a capability of the first tuner and the second tuner to tune in the one or more protected channels of broadcast content, as determined by a most recent periodic check;
receiving an indication of a desired program of broadcast content;
identifying, with reference to the tuning capability stored in the guide database, at least one of the first tuner and the second tuner that is capable of tuning in a channel of broadcast content on which the desired program of broadcast content is being broadcast;
determining that the identified tuner is currently being utilized to tune in a different program from the desired program;
determining whether a tuner different from the identified tuner is capable of tuning in a channel on which the different program is being broadcast; and
in response to the determining that the tuner different from the identified tuner is capable, continuing to receive the different program while simultaneously receiving the desired program by instructing the tuner different from the identified tuner to tune in the different program and instructing the identified tuner to tune in the desired program;
wherein the providing and the causing are performed at predetermined intervals of time and are triggered independently of user utilization of the first and second tuners.

2. The computer-readable memory of claim 1, comprising further computer-executable instructions for: obtaining the one or more tokens from one or more broadcast signals received by the at least one of the first tuner and the second tuner; and storing, in the guide database, on the per-channel basis, the one or more tokens.

3. The computer-readable memory of claim 1, comprising further computer-executable instructions for: notifying a user of a conflict between the desired program and the different program if the tuner different from the identified tuner is not capable of tuning in the channel on which the different program is being broadcast.

4. The computer-readable memory of claim 1, comprising further computer-executable instructions for: obtaining information regarding the broadcast content from broadcast signals; and storing the obtained information in the guide database.

5. The computer-readable memory of claim 1, comprising further computer-executable instructions for: obtaining information regarding the broadcast content through a network interface that is independent of both the first tuner and the second tuner; and storing the obtained information in the guide database.

6. The computer-readable memory of claim 1, wherein the cryptographic information comprises a cryptographic key with which the one or more protected channels of broadcast content can be decrypted.

7. The computer-readable memory of claim 1, wherein the cryptographic information comprises an algorithm with which the one or more protected channels of broadcast content can be descrambled.

8. A method of controlling a hybrid tuner comprising a first tuner and a second tuner, the method comprising the steps of:
periodically and automatically providing, to a first tuner and a second tuner, both part of a hybrid tuner system, one or more tokens comprising cryptographic information directed to tuning in one or more protected channels of broadcast content, the one or more protected channels of broadcast content being transmitted in a protected form such that they can only be tuned in by tuners possessing valid tokens, wherein one of the first tuner and the second tuner can properly tune in at least one channel of the broadcast content that another of the first tuner and the second tuner cannot properly tune in;
periodically and automatically causing the first tuner and the second tuner to attempt to tune in the one or more protected channels of broadcast content utilizing the provided one or more tokens;
modifying a guide database by storing, in the guide database, on a per-channel basis, a tuning capability of the first tuner and the second tuner to tune in the one or more protected channels of broadcast content, as determined by a most recent periodic check;
receiving an indication of a desired program of broadcast content;
identifying, with reference to the tuning capability stored in the guide database, at least one of the first tuner and the second tuner that is capable of tuning in a channel of broadcast content on which the desired program of broadcast content is being broadcast;
determining that the identified tuner is currently being utilized to tune in a different program from the desired program;
determining whether a tuner different from the identified tuner is capable of tuning in a channel on which the different program is being broadcast; and
in response to the determining that the tuner different from the identified tuner is capable, continuing to receive the different program while simultaneously receiving the desired program by instructing the tuner different from the identified tuner to tune in the different program and instructing the identified tuner to tune in the desired program;
wherein the providing and the causing are performed at predetermined intervals of time and are triggered independently of user utilization of the first and second tuners.

9. The method of claim 8, further comprising the steps of: obtaining the one or more tokens from one or more broadcast signals received by the at least one of the first tuner and the second tuner; and storing, in the guide database, on the per-channel basis, the one or more tokens.

10. The method of claim 8, further comprising the steps of: notifying a user of a conflict between the desired program and the different program if the tuner different from the identified tuner is not capable of tuning in the channel on which the different program is being broadcast.

11. The method of claim 8, further comprising the steps of: obtaining information regarding the broadcast content from broadcast signals; and storing the obtained information in the guide database.

12. The method of claim 8, further comprising the steps of: obtaining information regarding the broadcast content through a network interface that is independent of both the first tuner and the second tuner; and storing the obtained information in the guide database.

13. The method of claim 8, wherein the cryptographic information comprises a cryptographic key with which the one or more protected channels of broadcast content can be decrypted.

14. The method of claim 8, wherein the cryptographic information comprises an algorithm with which the one or more protected channels of broadcast content can be descrambled.

15. A computing device providing broadcast content to a user, the computing device comprising:
a hybrid tuner for receiving the broadcast content, the hybrid tuner comprising: a first tuner and a second tuner, wherein one of the first tuner and the second tuner can properly tune in at least one channel of the broadcast content that another of the first tuner and the second tuner cannot properly tune in; and one or more computer-readable media comprising computer-executable instructions directed to steps comprising:

periodically and automatically providing to the first tuner and the second tuner, one or more tokens comprising cryptographic information directed to tuning in one or more protected channels of broadcast content, the one or more protected channels of broadcast content being transmitted in a protected form such that they can only be tuned in by tuners possessing valid tokens;

periodically and automatically causing the first tuner and the second tuner to attempt to tune in the one or more protected channels of broadcast content utilizing the provided one or more tokens;

storing, in a guide database, on a per-channel basis, a tuning capability of the first tuner and the second tuner to tune in the one or more protected channels of broadcast content, as determined by a most recent periodic check;

receiving an indication of a desired program of broadcast content;

identifying, with reference to the tuning capability stored in the guide database, at least one of the first tuner and the second tuner that is capable of tuning in a channel of broadcast content on which the desired program of broadcast content is being broadcast;

determining that the identified tuner is currently being utilized to tune in a different program from the desired program;

determining whether a tuner different from the identified tuner is capable of tuning in a channel on which the different program is being broadcast; and in response to the determining that the tuner different from the identified tuner is capable, continuing to receive the different program while simultaneously receiving the desired program by instructing the tuner different from the identified tuner to tune in the different program and instructing the identified tuner to tune in the desired program;

wherein the providing and the causing are performed at predetermined intervals of time and are triggered independently of user utilization of the first and second tuners.

16. The computing device of claim 15, wherein the one or more computer-readable media comprise further computer-executable instructions for: obtaining the one or more tokens from one or more broadcast signals received by the at least one of the first tuner and the second tuner; and storing, in the guide database, on the per-channel basis, the one or more tokens.

17. The computing device of claim 15, wherein the one or more computer-readable media comprise further computer-executable instructions for: notifying a user of a conflict between the desired program and the different program if the tuner different from the identified tuner is not capable of tuning in the channel on which the different program is being broadcast.

18. The computing device of claim 15, wherein the first and second tuners have the differing capabilities to tune in the channels of broadcast content because the first tuner is communicationally coupled to a different broadcast content delivery mechanism than the second tuner.

19. The computing device of claim 15, wherein the first and second tuners and both communicationally coupled to a same broadcast content delivery mechanism, and wherein further the first tuner comprises a sub-card providing the first tuner with the different capabilities to tune in the channels of broadcast content from the second tuner.

20. The computing device of claim 15, further comprising a network interface independent of the hybrid tuner; wherein the one or more computer-readable media comprise further computer-executable instructions for: obtaining information regarding the broadcast content through the network interface; and storing the obtained information in the guide database.

* * * * *